United States Patent [19]

Yoshino

[11] Patent Number: 4,620,639

[45] Date of Patent: Nov. 4, 1986

[54] SYNTHETIC RESIN THIN-WALLED BOTTLE

[75] Inventor: Yataro Yoshino, Tokyo, Japan

[73] Assignee: Yoshino Kogyosho Co., Ltd., Tokyo, Japan

[21] Appl. No.: 472,997

[22] Filed: Apr. 26, 1983

Related U.S. Application Data

[63] Continuation of Ser. No. 89,537, Oct. 29, 1979, abandoned.

[30] Foreign Application Priority Data

| Nov. 7, 1978 | [JP] | Japan | 53-137419 |
| Nov. 24, 1978 | [JP] | Japan | 53-145690 |
| Nov. 24, 1978 | [JP] | Japan | 53-145689 |
| Dec. 4, 1978 | [JP] | Japan | 53-149871 |
| Dec. 11, 1978 | [JP] | Japan | 53-153313 |
| Dec. 18, 1978 | [JP] | Japan | 53-158253 |

[51] Int. Cl.$^4$ .................................... B65D 1/02
[52] U.S. Cl. ..................................... 215/1 C; 220/70
[58] Field of Search ............... 215/1 C; 220/70, 66, 220/69

[56] References Cited

U.S. PATENT DOCUMENTS

| 3,029,963 | 4/1962 | Evers | 215/1 C |
| 3,043,461 | 7/1962 | Glassco | 215/1 C |
| 3,403,804 | 10/1968 | Colombo | 215/1 C X |
| 3,948,404 | 4/1976 | Collins | 215/1 C |
| 3,973,693 | 8/1976 | Bocklehurst | 220/70 X |
| 4,024,975 | 5/1977 | Uhlig | 215/1 C |
| 4,036,926 | 7/1977 | Chang . | |
| 4,108,324 | 8/1978 | Krishnakumar et al. | 215/1 C |
| 4,134,510 | 1/1979 | Chang | 215/1 C |
| 4,170,622 | 10/1979 | Uhlig | 215/1 C X |
| 4,197,954 | 4/1980 | Oltman | 215/1 C |
| 4,249,666 | 2/1981 | Hubert | 220/70 X |
| 4,261,948 | 4/1981 | Krishnakumar et al. | 215/1 C |
| 4,334,627 | 6/1982 | Krishnakumar et al. | 215/1 C |
| 4,525,401 | 6/1985 | Pocock et al. | 215/1 C X |

FOREIGN PATENT DOCUMENTS

| 10454/76 | 7/1977 | Australia . |
| 293908 | 10/1971 | Austria . |
| 301379 | 9/1972 | Austria . |
| 1973838 | 9/1967 | Fed. Rep. of Germany . |
| 1801368 | 5/1969 | Fed. Rep. of Germany . |
| 1214626 | 4/1960 | France . |
| 1580798 | 9/1969 | France . |
| 2236634 | 2/1975 | France . |
| 2291104 | 6/1976 | France . |
| 2346226 | 10/1977 | France . |
| 2435396 | 4/1980 | France . |
| 7309253 | 1/1974 | Netherlands . |
| 7513278 | 5/1976 | Netherlands . |
| 7703245 | 10/1977 | Netherlands . |
| 7906151 | 3/1980 | Netherlands . |
| 1114304 | 5/1968 | United Kingdom . |
| 1161572 | 8/1969 | United Kingdom . |
| 1177875 | 1/1970 | United Kingdom . |
| 1239531 | 7/1971 | United Kingdom . |
| 1360107 | 7/1974 | United Kingdom . |
| 1406958 | 9/1975 | United Kingdom . |
| 1441657 | 7/1976 | United Kingdom . |
| 1528512 | 10/1978 | United Kingdom . |

Primary Examiner—Donald F. Norton
Attorney, Agent, or Firm—Parkhurst & Oliff

[57] ABSTRACT

This invention provides a synthetic resin thin-walled bottle, a tubular intermediate therefor and a method of producing a thin-walled bottle. The thin-walled bottle has ribs at least at its bottom portion, and the bottle bottom is raised up frusto-conically or has an undulatory shape. The tubular intermediate is first formed with ribs which become thin-walled protuberant ribs after blow molding. The thin-walled bottle is produced by blow-molding the ribbed tubular intermediate.

24 Claims, 26 Drawing Figures

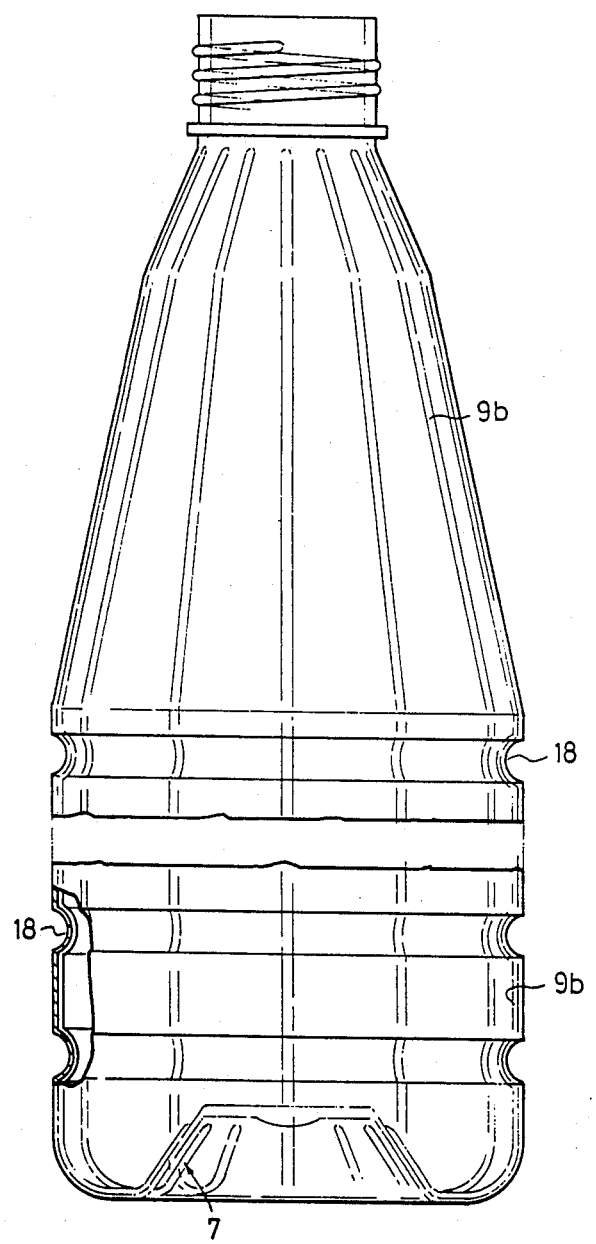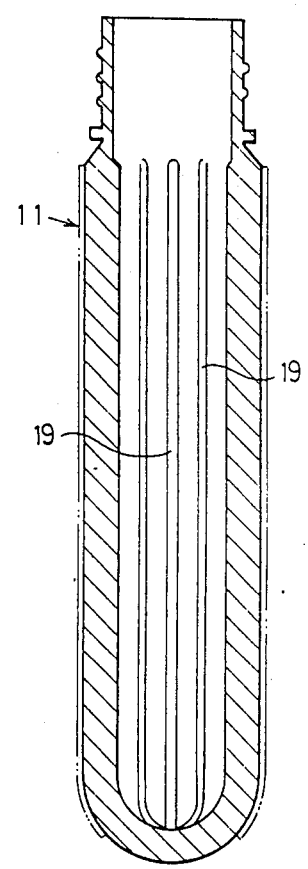

SYNTHETIC RESIN THIN-WALLED BOTTLE

This is a continuation of application Ser. No. 89,537 filed Oct. 29, 1979, abandoned.

FIELD OF THE INVENTION

This invention relates to a synthetic resin thin-walled bottle, particularly one formed with ribs at its bottom and/or other parts, and a method of producing such a bottle.

DESCRIPTION OF PRIOR ART

Heretofore, glass bottles have been prevalently used as containers for carbonated or refreshing drinks. However, because of their heavy weight, they have a high transportation cost and are also inconvenient to handle. Generally, the container cost and transportation cost account for a substantial portion of the price of such drinks, so that reduction of these costs can greatly influence the total price of the product.

In order to overcome such problems, attempts have been made to use a synthetic resin bottle which was reduced in wall thickness by means of biaxial orientation and which was formed cylindrical at its barrel portion and also bulged out spherically downwards at its bottom wall. Such bottle although thin-walled, is provided with sufficient strength because of biaxial orientation. However, since the bottom wall of the bottle is bulged out spherically downwards, the bottom can not be placed upright stably unless a skirt-like support member is additionally provided to the bottle bottom portion. This results in an increased cost and marred external appearance, and also if such support member is improperly fitted, the bottle may tilt and, during the automatic pouring of a liquid, the bottle mouth might be dislocated from the nozzle to cause improper charging of the liquid.

Provision of a bulged leg portion at the periphery of the bottle bottom wall may be conceived for effecting proper standing of the bottle, but in such a case, insufficient strength exists at the bottle bottom portion because the under side of the leg portion is excessively lessened in wall thickness making the bottle easily breakable.

OBJECTS OF THE INVENTION

The first object of this invention is to provide ridge-like ribs on the bottle wall for assuring high strength of a synthetic resin bottle even if it is thin-walled substantially in its entirely.

The second object of this invention is to form a frusto-conical raised-up portion at the bottle bottom so that even when such raised-up portion should be deformed during high-pressure charging of a liquid thereinto, the ground-engaging portion of the bottle remains unaffected.

The third object of this invention is to undulate the bottle bottom portion to increase bottle strength.

The fourth object of this invention is to provide a tubular intermediate used for forming a ribbed thin-walled bottle.

The fifth object of this invention is to provide a method of producing a ribbed, thin-walled bottle for an intermediate having the ribs on it.

BRIEF DESCRIPTION OF THE DRAWINGS

FIG. 6 is a partially cut-away perspective view of a thin-walled bottle in accordance with a third embodiment of this invention;

FIG. 7 is a sectional view of an intermediate used in the third embodiment of this invention;

DETAILED DESCRIPTION OF THE INVENTION

Figure 1:
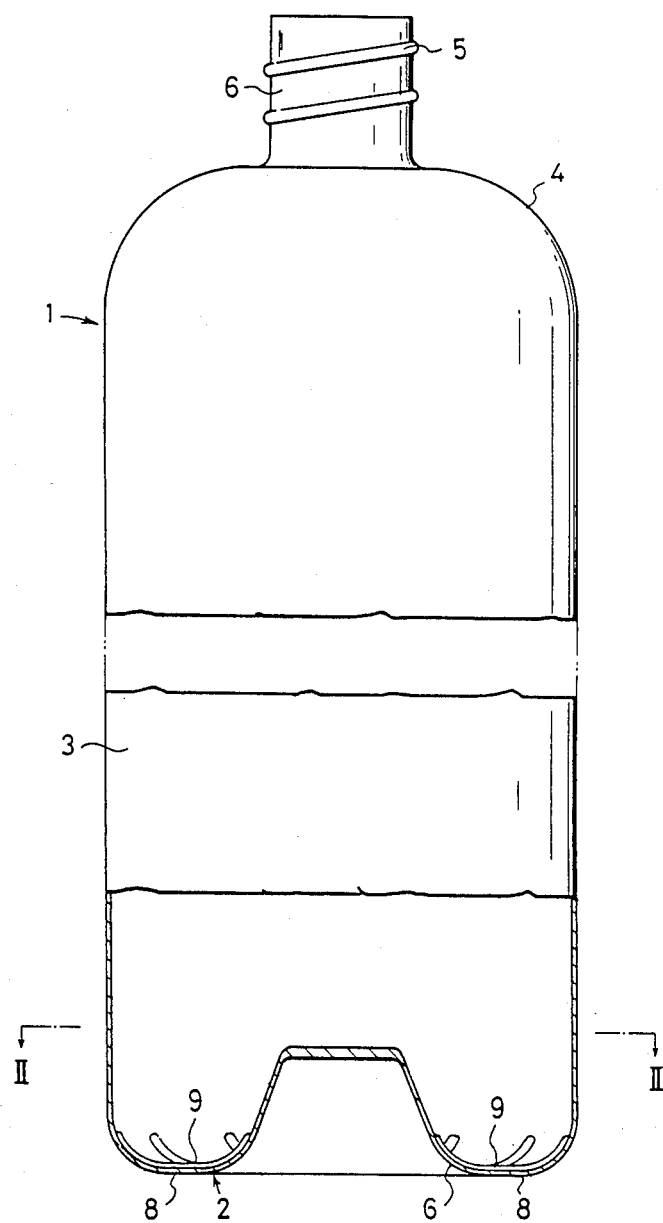
FIG. 1 is a partially cut-away sectional view of a synthetic resin made thin-walled bottle according to one embodiment of this invention.

Now, the first embodiment of this invention is described with reference to FIGS. 1 to 4. It will be seen that the biaxially oriented synthetic resin thin-walled bottle 1 of this invention comprises, from bottom upwards, a bottom wall 2, a cylindrical barrel portion 3, a shoulder portion 4 and a neck portion 6 having formed thereon an external thread 5 to be engaged with a cap. As for the material for the bottle of this invention, saturated polyester resin is preferred, but it is also possible to use other synthetic resins, such as polypropylene, vinyl chloride, etc., which are capable of increasing the mechanical strength of the bottle by biaxial orientation.

Figure 2:
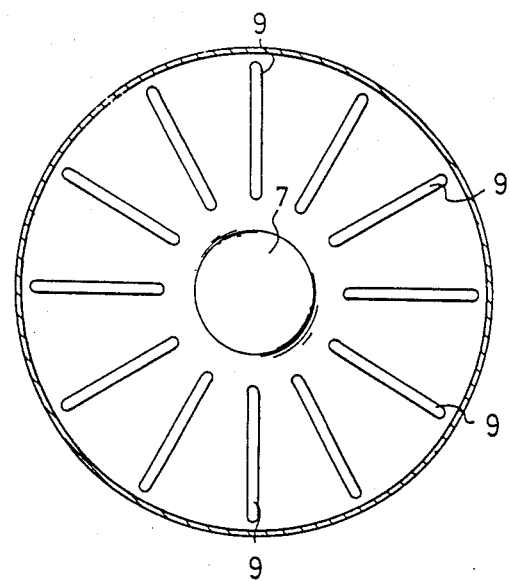
FIG. 2 is a sectional view taken along the line II—II of FIG. 1.

The bottom wall 2 of the bottle 1 is centrally bulged out inwardly of the bottle to form a frusto-conical portion or mountain-shaped rising 7. Thus, the underside of the bottom portion between the lower edge of said portion 7 and the lower end of the barrel portion 3 forms the ground-engaging section 8. On the inside of said ground-engaging section are provided a plurality of ridged ribs 9 which are arranged radially as viewed from above as shown in FIG. 2.

In case the wall thickness of the bottle is made extremely thin, the outer end of each of said ribs 9 is extended along the axial line to an upper part of the bottle barrel portion.

Figure 4:
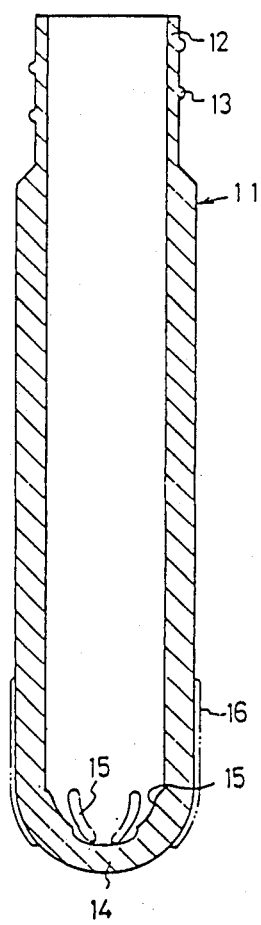
FIG. 4 is a sectional view of an intermediate used in the first embodiment of this invention.
Figure 26:
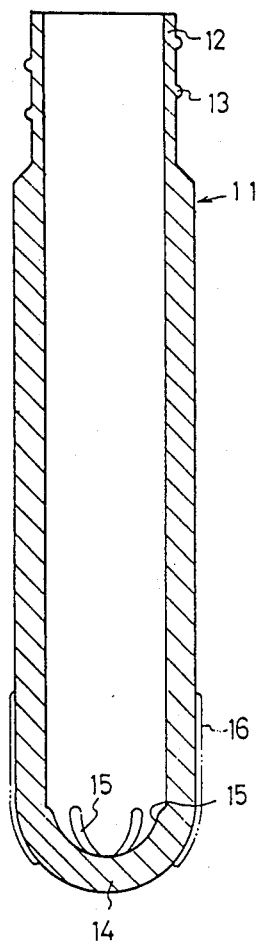
FIG. 26 is a sectional view of an intermediate used in the embodiment of FIG. 23.

The above bottle may be formed in the following way. First, a bottomed and top-open tubular intermediate 11 is formed by injection molding from a synthetic resin which can be biaxially oriented. The neck portion 12 of this tubular intermediate 11 is provided with an external thread 13 so that it can immediately serve as the neck of the bottle. On the inside of the bottom portion 14 of said tubular intermediate 11 are provided the ridges 15 such as shown in FIG. 4. Such ridges 15 are provided in plurality in radial arrangement from the center of the bottom, but no such ridge may be provided in the central part because of formation of the frusto-conical raised-up portion 7. The thus formed intermediate 11 is heated to a temperature at which blow molding can be accomplished, and then it is set in a blow molding die and while blowing compressed air thereinto, the interior side of the bottom portion 14 of said intermediate is pushed down by a push-down bar or other means to effectuate biaxial orientation. The molding die used here is one which has an internal configuration which allows formation of the desired external shape of the thin-walled bottle 1.

Figure 3:
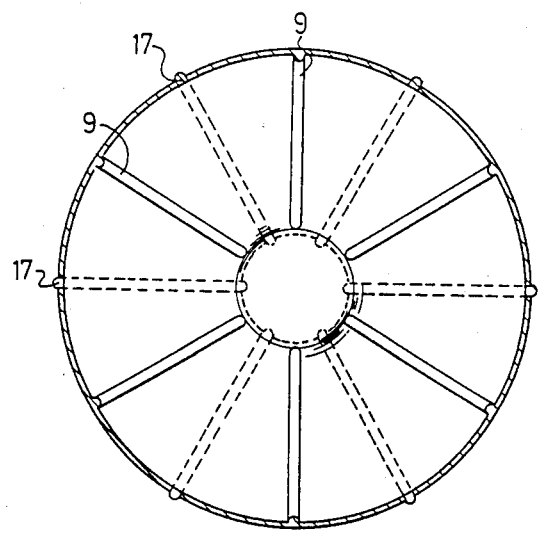
FIG. 3 is a cross-sectional view of a bottle which is a modified version of said first embodiment of the invention.

In case the additional ridges 16 are provided around the lower part of the intermediate 11, there will be formed the protuberant ribs 9, 17 on both inside and outside of the bottle as shown in FIG. 3 to further increase the bottle strength.

By forming the internal ribs by blow molding a parison, the external bottom portion of the bottle remains smooth at the location of the internal ribs, as shown in FIG. 1 and other figures described below.

Thus, the bottle of this invention is shaped cylindrical with small wall thickness, but being biaxially oriented, it has high mechanical strength and is light in weight. Also, since an inwardly projecting frusto-conical portion 7 is provided at the bottom, the bottle can well withstand the internal pressure which develops when a carbonated drink is charged into the bottle under high pressure, and even if the raised portion 7 should be deformed under such internal pressure, the bottle bottom won't swell out spherically downwards as in the case of a flat-bottomed bottle, and hence horizontality of the ground-engaging portion 8 of the bottle won't be impaired. Therefore, the bottle won't tilt when it is placed uprightly, and further, since a plurality of ribs 9 are provided radially (as viewed from above) on the inside of the ground-engaging section 8 of the bottom wall, the strength of the lower portion of the bottle is increased to provide an extremely high impact strength at accidental drop of the bottle.

Figure 5:
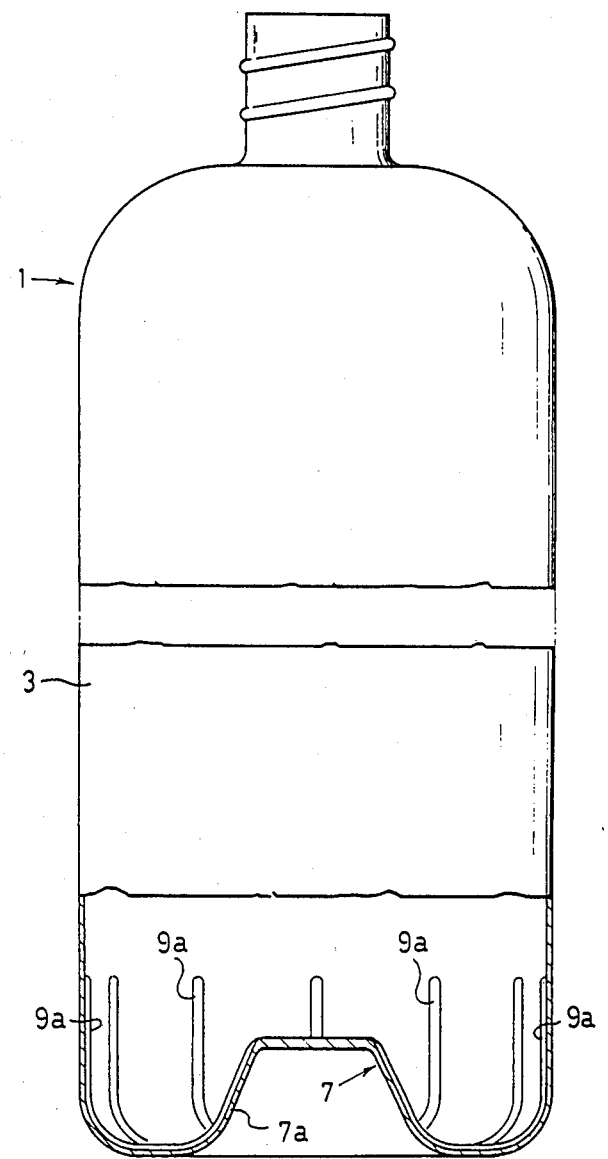
FIG. 5 is a partially cut-away sectional view of a thin-walled bottle according to a second embodiment of this invention.

Referring to FIG. 5, there is shown a second embodiment of this invention where the ridged ribs 9a formed at the bottle bottom portion extend to the slant of the frusto-conical portion 7 and also to the lower part of the barrel portion 3 of the bottle thereby to increase resistance against buckling load at the lower section of the bottle barrel portion.

Figure 23:
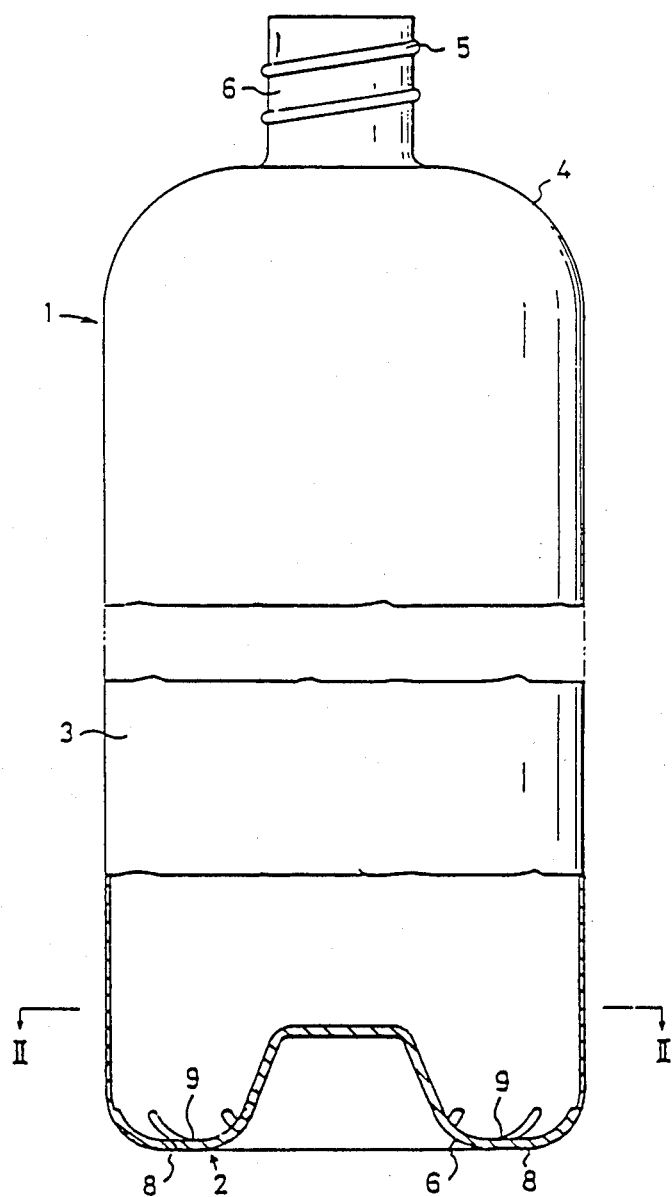
FIG. 23 is a partially cut-away sectional view of a thin-walled bottle according to a modified version of said second embodiment of the invention.
Figure 24:
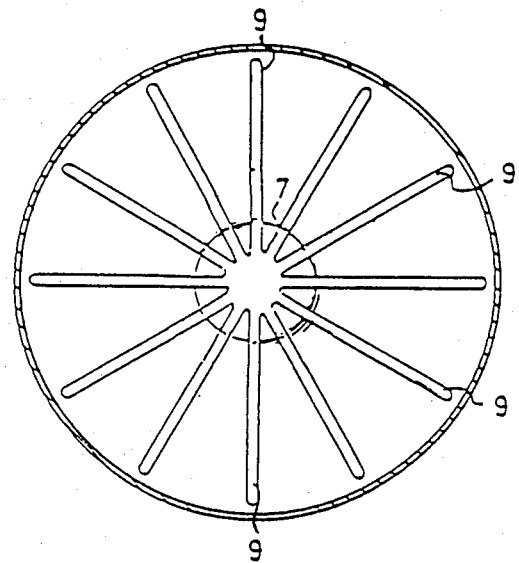
FIG. 24 is a sectional view taken along the line II—II of FIG. 23.
Figure 25:
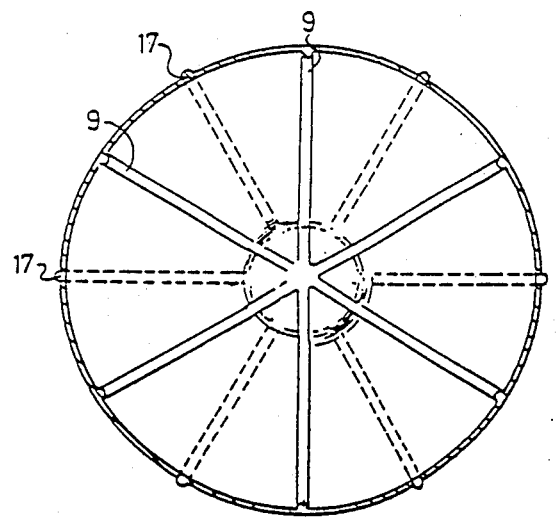
FIG. 25 is a cross-sectional view of a bottle which is a modified version of the bottle of FIG. 23.

A modification of this embodiment appears in FIGS. 23-26. The ridges 15 cross the bottom of the intermediate of FIG. 26. Upon blow molding, this creates a bottle as shown in FIGS. 23-25 in which the ribs 9 extend up the slant of the frusto-conical portion 7.

A third embodiment of this invention is shown in FIGS. 6 and 7. In this embodiment, the ribs 9b are formed extending along the full axial length of the barrel portion as shown in FIG. 6, whereby the buckling strength is greatly increased.

There are also provided ring-shaped annular constrictions 18 around the lower part of the barrel portion 3. This can increase the stretch ratio of the barrel portion 3 while elevating its strength owing to the rib function.

The intermediate used in this embodiment is provided with long strips of ridges 19 which extend along the axial line of the tubular intermediate 11. Such ridges 19 may be provided on the outer periphery of the intermediate 11.

Figure 8:
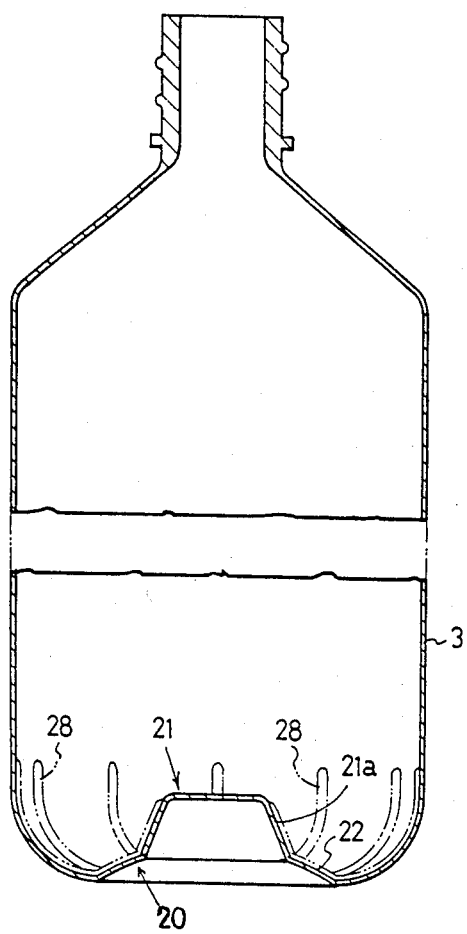
FIG. 8 is a sectional view of a thin-walled bottle according to a fourth embodiment of this invention.
Figure 9:
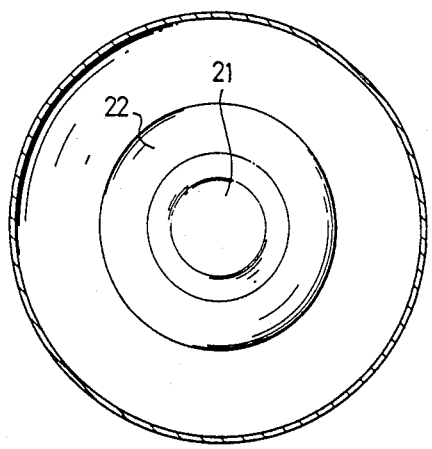
FIGS. 9 and 10 are bottom views showing the different bottom configurations of the fourth embodiment of this invention.
Figure 10:
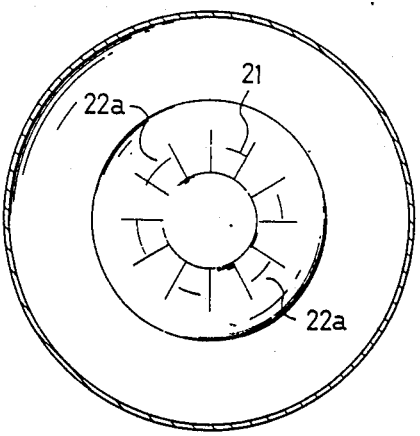

In FIGS. 8 to 14 is shown a fourth embodiment of this invention. In this case, the bottle bottom portion 20 has its central part bulged out inwardly of the bottle to form a frusto-conical raised-up portion 21, with the base part of said raised-up portion 21 being stepped to form a gentle rising portion 22. This portion 21 may be either formed into a continuous suacer-like part as shown in FIG. 9 or may be stepped radially at several sections as shown in FIG. 10.

Figure 11:
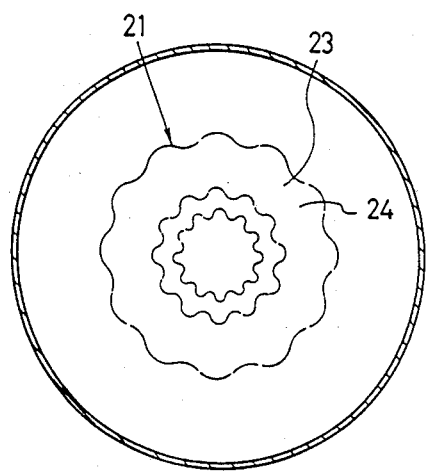
FIGS. 11, 12, 13 and 14 are sectional views of the principal parts of the bottles which are modified versions of the fourth embodiment of this invention.
Figure 13:
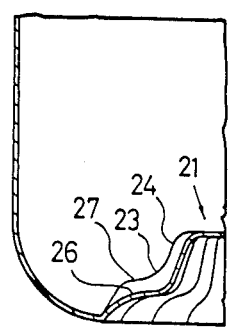
Figure 12:
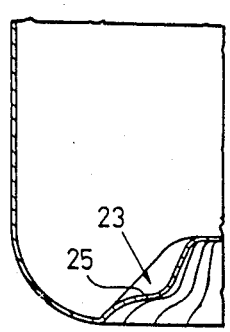
Figure 14:
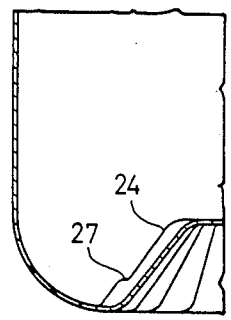

As a modification of said fourth embodiment, the frusto-conical raised-up portion 21 may be formed undulately by forming continuous recessions and ridges alternately as shown in FIG. 11. As shown in FIG. 11, the width of the recessions may be equal to that of the ridges. Also, stepped portions 25, as viewed in the axial direction of the bottle, may be formed at the recessions 23 as shown in FIG. 12. In still other modifications, the stepped portions 25 may be provided in both recessions 23 and ridges 24 as shown in FIG. 13 or only in the ridges 24 as shown in FIG. 14.

Further, a plurality of protuberant ribs 28 may be formed radially from the central part of the bottom wall, as viewed from above, on the interior of the lower portion of the bottle, as shown in FIG. 8. In this case, the strength of the bottle bottom is further increased if the protuberant ribs are so provided as to extend to the slant 21a of the raised-up portion 21 and also to the lower part of the bottle barrel portion 3.

Thus, in the thin-walled bottle according to the fourth embodiment of this invention, since a stepped region is formed at the lower end of the raised-up portion, the surface area of the raised-up portion is more enlarged than in the case of other embodiments, resulting in an increased degree of stretching of the bottom wall and elevated rigidity of the bottom wall owing to the rib function. For further increasing the strength of the bottom wall of the bottle, the protuberant ribs are formed at the pertinent area.

Figure 15:
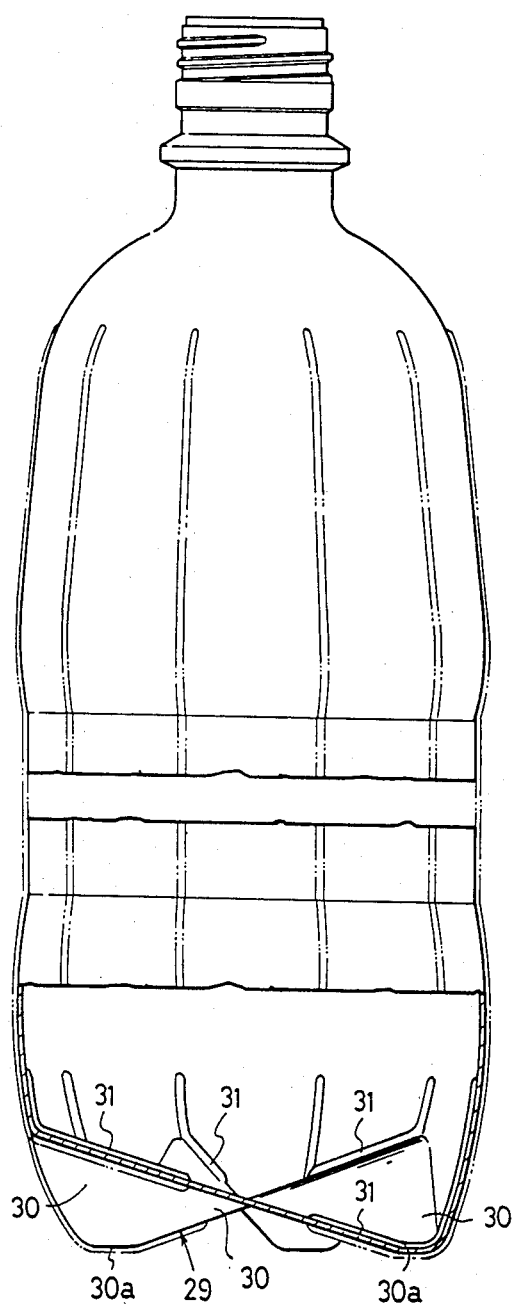
FIG. 15 is a partially cut-away view of a thin-walled bottle according to a fifth embodiment of this invention.
Figure 16:
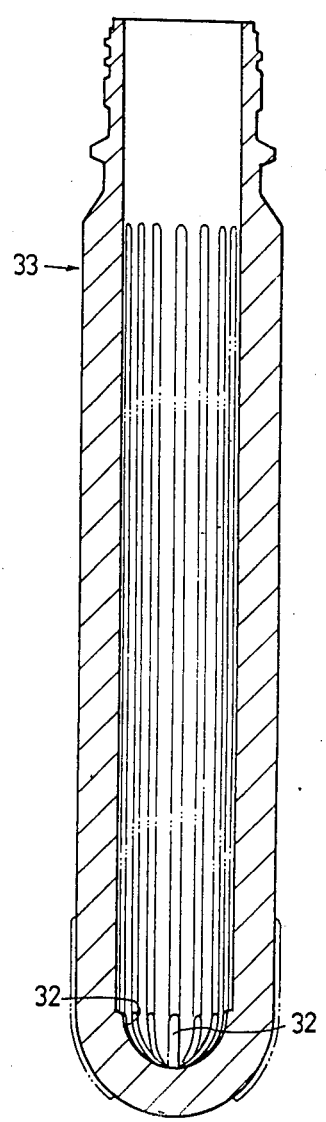
FIG. 16 is a sectional view of an intermediate used in the fifth embodiment.
Figure 17:
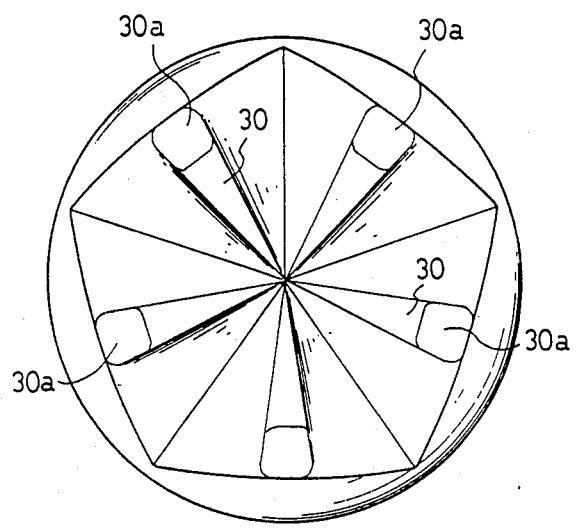
FIG. 17 is a bottom view of the embodiment of FIG. 15.

Now, a fifth embodiment of this invention is described with reference to FIGS. 15 to 17. The bottom portion 29 of the thin-walled bottle is provided with continuous jagged ribs 30 arranged radially from the center of the bottom and undulatory in sectional shape.

These ribs 30 are so arranged that their height is zero at the center of the bottle bottom but gradually increases toward the outer periphery, and the outer side of the bottom portion of each said rib 30 is designed to form a ground-engaging section 30a for allowing upright standing of the bottle.

Additional ridged ribs 31 are formed at the bends of each undulation formed by the ribs 30 on the inside of the bottom portion of the bottle, said ribs 31 extending down to the lower part of the bottle barrel portion. Although no ribs 31 are provided at the central part of the bottle bottom portion, they may be formed extending along the full vertical length of the bottle barrel portion. Where no impediment is given to use of the bottle, the ribs may be also provided on the external surface of the bottle to further increase its strength.

For forming the above-described thin-walled bottle, a tubular intermediate 33 having the ridges 32 is subjected to blow molding in a blow molding die in the same way as Example 1, thereby forming a bottle having the radial ribs 30 at the bottom.

The thus made thin-walled bottle is extremely enhanced in strength of its bottom portion by dint of the ribs 30 at the bottom and the ridged ribs 31 at the bottom and barrel portion of the bottle. The ridged ribs on the interior of the bottle are provided as the ridges formed on the interior of the intermediate remain as they are after blow molding, but when the ridged ribs are formed on the exterior of the bottle, blow molding of the bottle becomes easier as there is no need of giving consideration to formation of the ridged ribs on the interior of the bottle. In this case, the grooves corresponding to the ridged ribs to be formed are provided in the molding die.

Figure 18:
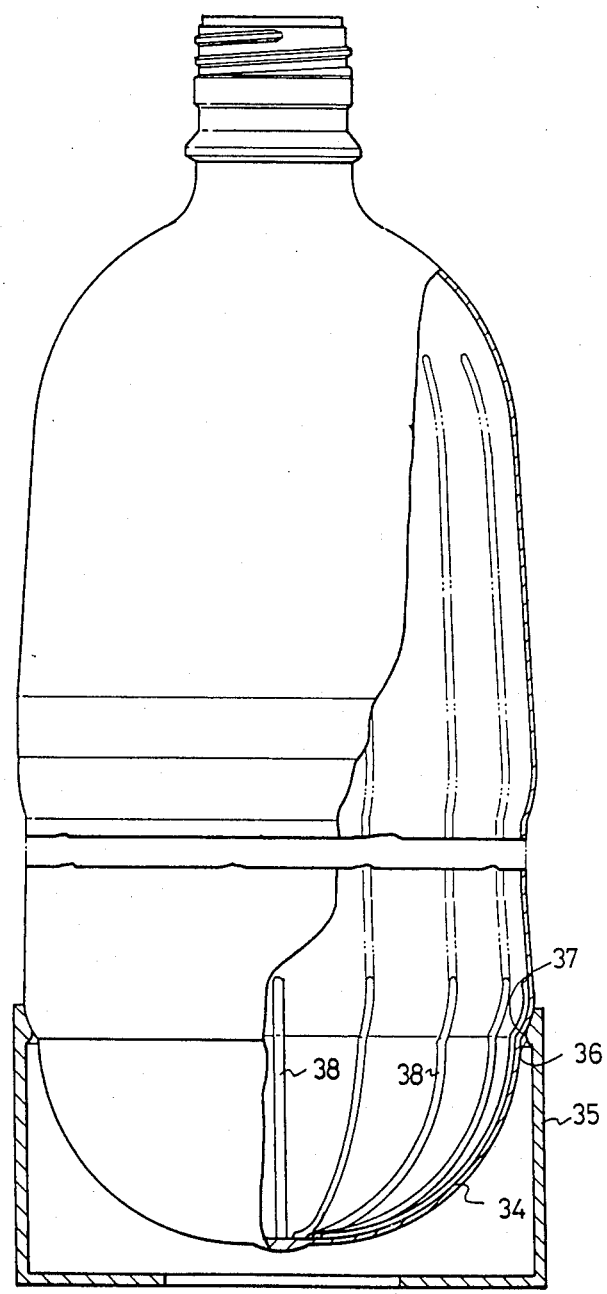
FIG. 18 is a partially cut-away view of a thin-walled bottle according to a sixth embodiment of this invention.
Figure 19:
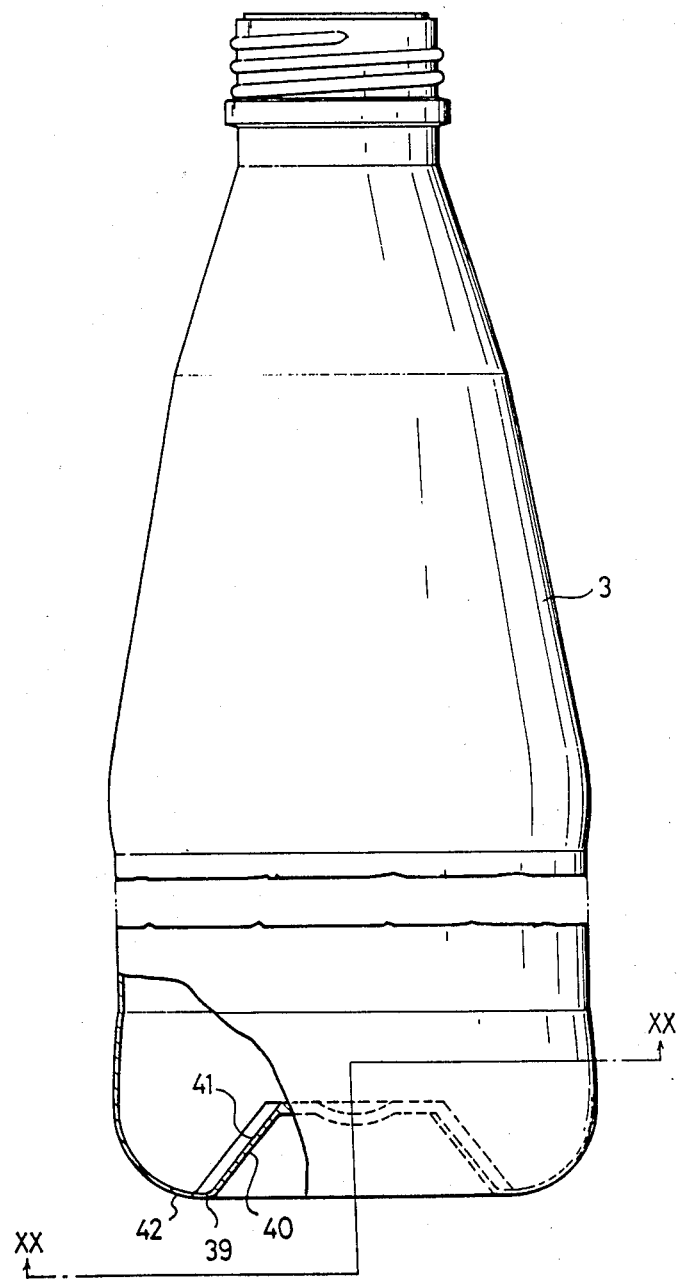
FIG. 19 is a partially cut-away view of a thin-walled bottle according to a seventh embodiment of this invention.

Reference is now had to FIG. 18 for explaining the sixth embodiment of this invention. In this embodiment, the bottom portion 34 of the bottle is bulged out spherically downwards. Since the bottle is unable to stand upright by itself, there is required a supporting leg member 35 that fits with the bulging bottom portion of the bottle. It will be seen that the top protuberant portion 36 of said leg member 35 fits with the corresponding annular stepped portion 37 formed at the lower part of the bottle.

There are also provided on the interior of the bottle bottom portion 34 a plurality of ridged ribs 38 arranged radially from the center of the bottom portion. If necessary, such ridged ribs 38 may be extended all the way to an upper part of the bottle.

In this embodiment, because of the spherical configuration, the bottom portion of the bottle is very tough and also blow molding is facilitated.

Figure 20:
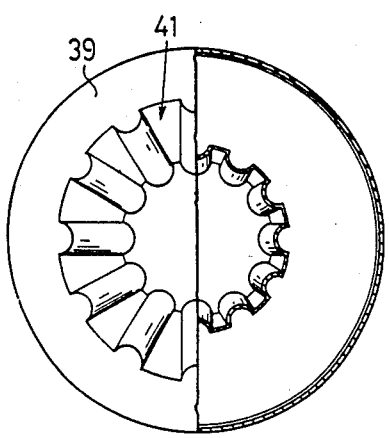
FIG. 20 is a view taken along the line XX—XX of FIG. 19 in the direction of arrows.
Figure 21:
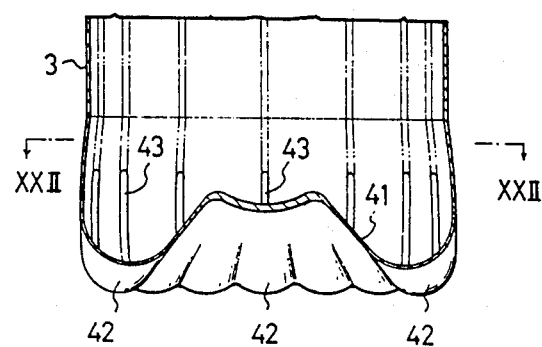
FIG. 21 is a sectional view of the principal parts of a bottle which is a modification of the seventh embodiment of this invention.
Figure 22:
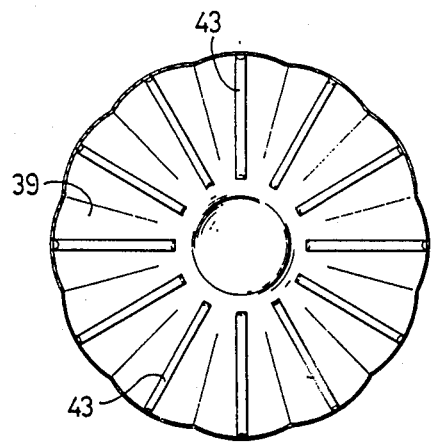
FIG. 22 is a sectional view taken along the line XXII—XXII of FIG. 20.

Referring to FIGS. 19 to 22, there is shown a seventh embodiment of this invention. In this embodiment, the central part of the bottom portion 39 of the bottle is bulged inwardly of the bottle to form a frusto-conical raised-up portion 40 and the slant 41 thereof is formed undulately as shown in FIG. 20. If the undulation on the slant 41 is formed extending to the ground-engaging section 42 of the bottle bottom and to the lower part of the bottle barrel portion 3, the lower portion of the bottle is made more strong.

For increasing strength of the lower portion of the bottle, additional ridged ribs 43 are formed at the crests of the respective waves or at the bends between the waves in addition to said undulation extending from the slant 41 to the ground-engaging section 42 of the bottle bottom and to the lower part of the bottom barrel portion 3. The length of such ridged ribs 43 may be suitably determined depending on the desired bottle strength. Said ribs 43 are usually formed on the interior of the bottle, but where no impediment is caused in use of the bottle, such ribs may be formed on the outside of the bottle.

The thin-walled bottle of this embodiment can be formed in the same way as in Example 1 but by using a blow molding die having the undulatory hollows at the part corresponding to the lower portion of the bottle.

The thin-walled bottle according to this seventh embodiment is increased in degree of stretch at the lower portion of the bottle because of its undulatory configuration and hence enlarged surface area. Further, the bends between the waves can function as ribs, so that this bottle, although thin-walled, can well withstand high pressure under which a carbonated drink is charged thereinto. The frusto-conical rising at the bottle bottom, coupled with the undulatory configuration, can further enhance the stretch ratio.

If the thin-walled bottle of this invention is made from a saturated polyester resin, there is no likelihood of any harmful substance such as solvent remaining in the bottle in use and also no poisonous gas is generated when the discarded bottle is burned.

What is claimed is:

1. A biaxially oriented synthetic resin thin-walled bottle, made by blow molding an injection molded intermediate, comprising a neck portion defining an opening, a hollow cylindrical barrel body portion interconnecting said neck portion and a bottom portion, said bottom portion having a central part bulged inwardly to form a frusto-conical raised portion and an annular ground contacting wall surrounding said raised portion and connecting with said barrel body portion, wherein:

the inner surface of said annular ground contacting wall is provided with a plurality of inwardly projecting rigid ribs so that said bottom portion at the positions of said rigid ribs is thicker than the remainder of the bottom portion, said outer surface of said bottom portion being uniformly smooth and continuous at the locations of said internal rigid ribs;

said rigid ribs being formed integrally with said bottom portion during the blow molding of said injection molded intermediate having a plurality of ridges provided on its internal surface which correspond to said rigid internal ribs of said biaxially oriented bottle, said rigid internal ribs being the result of the expansion of said ridges of said intermediate during biaxial orientation only.

2. A bottle in accordance with claim 1, wherein said internal rigid ribs extend to the barrel portion of said bottle.

3. A bottle in accordance with claim 1, wherein said internal rigid ribs extend to the base of said frusto-conical portion.

4. A bottle in accordance with claim 1, wherein the ridges of said intermediate are extended so that the ribs of said bottle extend from a point on said frusto-conical raised portion to a point on said cylindrical barrel portions of said bottle.

5. A bottle in accordance with claim 1, wherein said ridges of said intermediate are extended so that said ribs of said bottle extend axially along the barrel portion of said bottle.

6. A bottle in accordance with claim 1, wherein a plurality of exterior ridges are provided on said intermediate and form radially extending ribs on the exterior of said bottom portion of said bottle when said intermediate is biaxially oriented into said bottle shape.

7. A bottle in accordance with claim 1, wherein the ground contacting surface of said annular ground contacting wall is flat.

8. A bottle in accordance with claim 1, wherein a step portion is provided along the slant of said frusto-conical raised portion.

9. A bottle in accordance with claim 8, wherein said ridges of said intermediate are extended so that the ribs of said bottle extend along said frusto-conical raised portion to said stepped portion.

10. A bottle in accordance with claim 9, wherein said stepped portion forms a continuous annulus and defines a base of said frusto-conical raised portion.

11. A bottle in accordance with claim 9, wherein said stepped portion forms a stepped annulus and defines a base of said frusto-conical raised portion.

12. A biaxially oriented synthetic resin thin-walled bottle produced by a method comprising the steps of:
forming a hollow one-piece intermediate having a first end and a second end with a thin-walled cylindrical portion therebetween, said first end being open and said second end being closed by a bottom provided with a semi-circular cross section, the extremes of said semi-circular cross section being integral with the walls of said cylindrical portion, said bottom of said intermediate being provided with a plurality of raised ridges on its internal surface,
heating and biaxially orienting said intermediate into the finished shape of said bottle having a bottom portion with a central area bulged inwardly to form a frusto-conical raised portion and connecting with said cylindrical portion of said bottle via an annular ground contacting wall, the inner surface of said annular ground contacting wall having rigid raised reinforcement ribs formed thereon which conform to the shape of said annular wall and correspond to the ridges of said intermediate and are the result of expansion of the ridges of said intermediate during biaxial orientation.

13. A bottle in accordance with claim 12, wherein said rigid ribs extend to the cylindrical portion of said bottle.

14. A bottle in accordance with claim 12, wherein said internal rigid ribs extend to the base of said frusto-conical portion.

15. A bottle in accordance with claim 12, wherein the ridges of said intermediate are extended so that the ribs of said bottle extend from a point on said frusto-conical raised portion to a point on said cylindrical portion of said bottle.

16. A bottle in accordance with claim 12, wherein said ridges of said intermediate are extended so that ribs of said bottle extend axially along the cylindrical portion of said bottle.

17. A bottle in accordance with claim 12, wherein a plurality of exterior ridges are provided on said intermediate and form radially extending ribs on the exterior of said bottom portion of said bottle when said intermediate is biaxially oriented into said bottle shape.

18. A bottle in accordance with claim 12, wherein the ground contacting surface of said annular ground contacting wall is flat.

19. A bottle in accordance with claim 12, wherein a step portion is provided along the slant of said frusto-conical raised portion.

20. A bottle in accordance with claim 19, wherein said ridges of said intermediate are extended so that the ribs of said bottle extend along said frusto-conical raised portion to said stepped portion.

21. A bottle in accordance with claim 20, wherein said stepped portion forms a continuous annulus and defines a base of said frusto-conical raised portion.

22. A bottle in accordance with claim 20, wherein said stepped portion forms a stepped annulus and defines a base of said frusto-conical raised portion.

23. A biaxially oriented synthetic resin thin-walled bottle comprising a neck portion defining an opening, a bottom portion, a barrel portion having a circular cross-sectional shape interconnecting said neck and bottom portions, said bottom portion having a central part bulged inwardly of the bottle to form a frusto-conical raised portion with the slant of said raised portion being undulated in the axial direction of the bottle to form alternate recesses and ridges about a circumferential periphery of said raised portion on the interior of said bottom portion, the width of said recesses being equal to that of said ridges.

24. A thin-walled bottle according to claim 23, wherein a stepped portion is provided at the undulated slant of the frusto-conical raised portion in at least one of said recesses and said ridges.

* * * * *